US011409020B2

(12) United States Patent
Wang

(10) Patent No.: US 11,409,020 B2
(45) Date of Patent: Aug. 9, 2022

(54) METHOD AND APPARATUS FOR OBTAINING RESIDUAL GRAVITY ANOMALY

(71) Applicant: BEIJING CSGG ENERGY TECHNOLOGY CO. LTD., Beijing (CN)

(72) Inventor: Zhenli Wang, Beijing (CN)

(73) Assignee: BEIJING CSGG ENERGY TECHNOLOGY CO. LTD, Beijing (CN)

( * ) Notice: Subject to any disclaimer, the term of this patent is extended or adjusted under 35 U.S.C. 154(b) by 35 days.

(21) Appl. No.: 16/764,281

(22) PCT Filed: Mar. 23, 2018

(86) PCT No.: PCT/CN2018/080199
§ 371 (c)(1),
(2) Date: Jul. 23, 2020

(87) PCT Pub. No.: WO2019/104912
PCT Pub. Date: Jun. 6, 2019

(65) Prior Publication Data
US 2020/0371268 A1  Nov. 26, 2020

(30) Foreign Application Priority Data
Nov. 28, 2017  (CN) .......................... 201711216885.9

(51) Int. Cl.
*G01V 7/00* (2006.01)
(52) U.S. Cl.
CPC ...................... *G01V 7/00* (2013.01)
(58) Field of Classification Search
CPC ... G01V 7/00; G01V 7/14; G01V 8/00; G01V 9/02; G01V 11/00; G01V 2200/00;
(Continued)

(56) References Cited

U.S. PATENT DOCUMENTS

| 6,993,433 B2* | 1/2006 | Chavarria | ................ G01V 1/28 |
| | | | 702/14 |
| 2009/0319243 A1* | 12/2009 | Suarez-Rivera | ........ G06T 17/05 |
| | | | 703/10 |

(Continued)

FOREIGN PATENT DOCUMENTS

RU  2501047 C2  12/2013

OTHER PUBLICATIONS

Yang, Peisheng, Research in the Method of Extracting Gravity and Magnetic Local Anomalies and the Application. Chinese Master's Theses Full-text Database (Electronic Journal), Basic Sciences, No. 04, pp. A011-315, Apr. 15, 2015) (Year: 2015).*

(Continued)

*Primary Examiner* — Daniel R Miller
*Assistant Examiner* — Eric Sebastian Von Wald
(74) *Attorney, Agent, or Firm* — Marshall, Gerstein & Borun LLP

(57) ABSTRACT

Disclosed are method and apparatus for obtaining residual gravity anomaly. The method comprises obtaining Bouguer gravity anomaly of a target region, determining a first pre-set range corresponding to each sampling point in the target region, obtaining a first regional field value of each sampling point in the first pre-set range through a surface fitting method based on the coordinate and field value of the sampling point, traversing the target region to obtain first regional gravity anomaly of the target region according to the first regional field values of the sampling points in the target region, and obtaining first residual gravity anomaly of the target region according to the Bouguer gravity anomaly and the first regional gravity anomaly. The residual gravity anomaly thus obtained is more accurate, thus enabling an accurate prediction of an underground geological body.

8 Claims, 10 Drawing Sheets

(58) Field of Classification Search
CPC .. B01D 23/00; B60G 2400/63; G01C 21/185; G05B 2219/39194; G01N 2001/2021; G01N 9/00; G01N 9/36; G10H 2220/395; G01B 3/1092; G01B 21/045
See application file for complete search history.

(56) References Cited

U.S. PATENT DOCUMENTS

| | | | |
|---|---|---|---|
| 2010/0014384 A1* | 1/2010 | Colombo | G01V 1/303 367/73 |
| 2018/0052251 A1* | 2/2018 | Cao | G01V 3/38 |

OTHER PUBLICATIONS

Li, Chunfang, The Research on the Separating Methods for Potential Field in Space Domain, Chinese Master's Theses Full-text Database (Electronic Journal), Basic Sciences, No. 01, pp. A011-221, Jan. 15, 2012. (Year: 2012).*

International Search Report for International Application No. PCT/CN2018/080199, dated Jul. 30, 2018.

Written Opinion for International Application No. PCT/CN2018/080199, dated Jul. 30, 2018.

Yang, Peisheng. Research in the Method of Extracting Gravity and Magnetic Local Anomalies and the Application. Chinese Master's Theses Full-text Database (Electronic Journal), Basic Sciences), pp. A011-A315, Apr. 15, 2015.

Li, Chunfang, The Research on the Separating Methods for Potential Field in Space Domain. Chinese Master's Theses Full-text Database (Electronic Journal), Basic Sciences), pp. A011-A221, Jan. 15, 2012.

First Office Action for CN Application No. 201711216885.9, dated Jan. 2, 2019.

SAGD microgravity feature analysis of residual anomaly, dated Oct. 31, 2017.

* cited by examiner

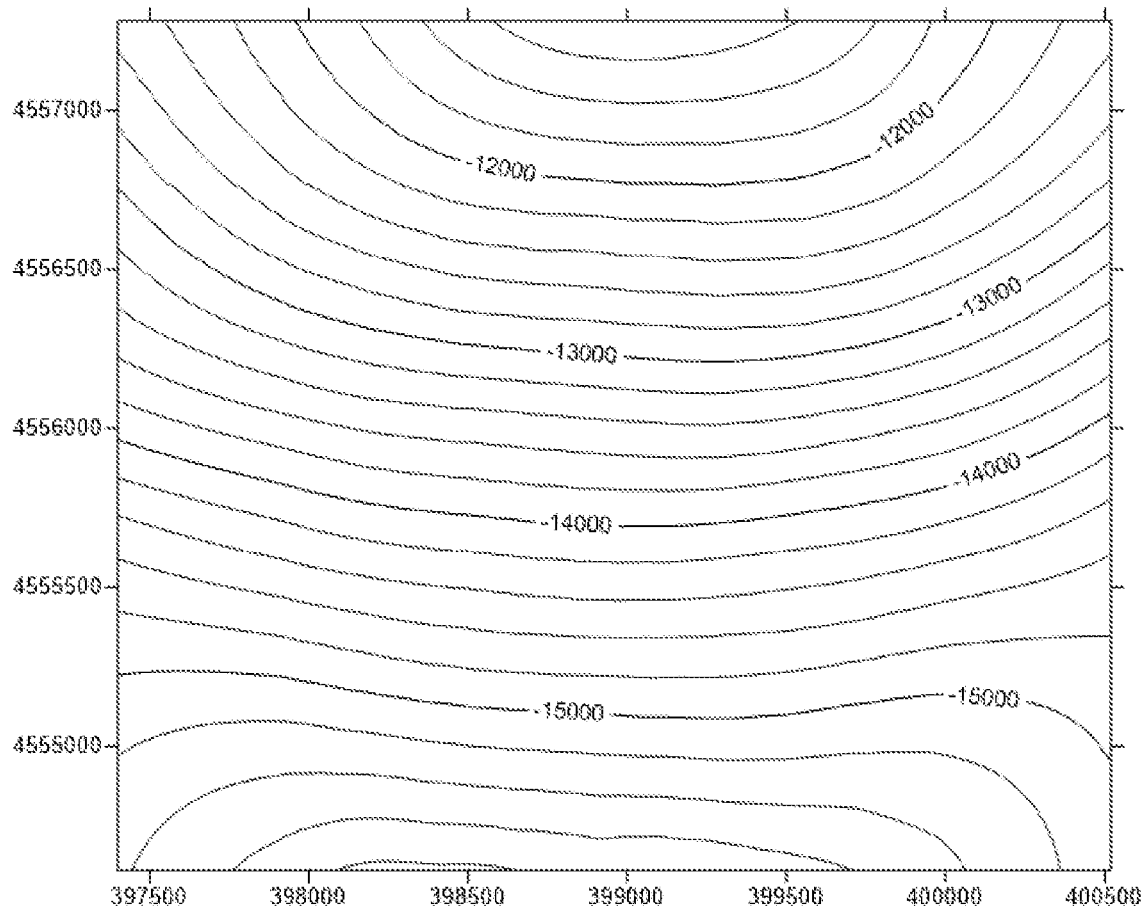

Fig. 4

Perform surface fitting based on the coordinate and field value of a sampling point and the coordinates and field values of k first reference sampling points around the sampling point in the first preset range corresponding thereto, to obtain the gravity anomaly surface of the first region corresponding to the sampling point — S2031

Substitute the coordinates of the sampling point into the gravity anomaly surface of the first region corresponding to the sampling point to obtain the field value of the first region of the sampling point — S2032

Fig. 5

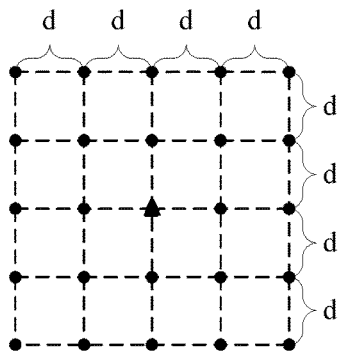

Fig. 6

```
┌─────────────────────────────────────────────────────────────────────────┐
│ Perform surface fitting based on the coordinate and field value of a    │
│ sampling point and the coordinates and field values of k second         │── S2071
│ reference sampling points around the sampling point in the second       │
│ preset range corresponding thereto, to obtain the gravity anomaly       │
│ surface of the second region corresponding to the sampling point        │
└─────────────────────────────────────────────────────────────────────────┘
                                     │
                                     ▼
┌─────────────────────────────────────────────────────────────────────────┐
│  Substitute the coordinate of the sampling point into the gravity       │
│  anomaly surface of the second region corresponding to the sampling     │── S2072
│  point to obtain the field value of the second region of the sampling   │
│                                point                                    │
└─────────────────────────────────────────────────────────────────────────┘
```

Fig. 7

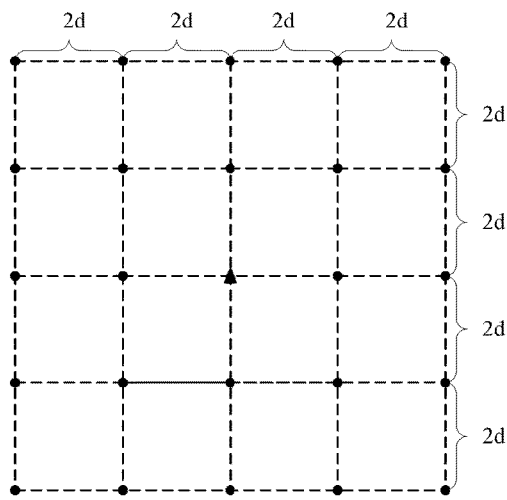

Fig. 8

METHOD AND APPARATUS FOR OBTAINING RESIDUAL GRAVITY ANOMALY

CROSS-REFERENCE TO RELATED APPLICATIONS

This is the United States National Phase of PCT/CN2018080199, filed on Mar. 23, 2018, which claims the priority benefit of Chinese patent application No. 201711216885.9 filed with the National Intellectual Property Administration of the People's Republic of China on Nov. 28, 2017, titled "Method and Apparatus for Obtaining Residual Gravity Anomaly", the entire contents of each of which are hereby incorporated herein by reference.

BACKGROUND OF THE INVENTION

Field of the Invention

The present invention relates to the technical field of geological mapping, and more specifically to a method and apparatus for obtaining residual gravity anomaly.

Background Art

In geological exploration, observed gravity field is generally used to predict the underground geological bodies. The actually observed gravity field, namely Bouguer gravity anomaly, can be divided into three parts: far-source region, near-source region and target layer. The far-source region refers to the region far away from the target layer. The gravity field generated by its material density (i.e. the far-source region) generally changes smoothly and linearly in the observation region. The near-source region refers to the region closely adjacent to the target layer. Due to the close adjacent to the target layer, the gravity field generated by its material density (i.e. the near-source region) will be entangled with the target layer and change faster than the far-source region. The target layer is the gravity field generated by the density of substance in the target region.

Due to the non-uniform distribution of underground substance, after extracting the far-source and near-source regions in Bouguer anomaly, there may still be some residual gravity in the extracted anomaly field, i.e. residual gravity anomaly. The purpose of residual gravity anomaly extraction is to show the gravity anomaly changes caused by density anomaly in the target region, so as to predict the geological bodies in the target region.

However, with the conventionally used method of separating residual gravity anomaly, there are still errors in the extracted residual gravity anomaly, which leads to abnormal distortion of the extracted residual gravity anomaly and hence inaccurate prediction of the shape of the actual geological bodies. Especially, in the process of microgravity extraction process, the error of residual gravity anomaly seriously affects the accuracy of subsequent prediction results of the geological bodies.

SUMMARY OF THE INVENTION

In view of the above, the present invention provides a method and apparatus for obtaining residual gravity anomaly, which can solve the problem of residual gravity extraction error in the prior art and avoid the influence of the error of subsequent prediction results of the geological bodies.

A method for obtaining residual gravity anomaly provided by an example of the present invention comprises:

obtaining a Bouguer gravity anomaly in a target region, wherein the Bouguer gravity anomaly comprises coordinates and field values of a plurality of sampling points in the target region;

determining a first pre-set range corresponding to each sampling point in the target region;

obtaining a first regional field value of sampling points within the first pre-set range corresponding to each sampling point using a surface fitting method based on coordinates and field values of the sampling points;

traversing the target region to obtain a first regional gravity anomaly of the target region according to the first regional field values of the sampling points in the target region; and obtaining a first residual gravity anomaly of the target region according to the Bouguer gravity anomaly and the first regional gravity anomaly.

Alternatively, "obtaining a first regional field value of a sampling point using a surface fitting method based on coordinates and a field value of the sampling point within the first pre-set range corresponding to each sampling point" comprises:

performing surface fitting based on the coordinate and field value of a sampling point and the coordinates and field values of k first reference sampling points around the sampling point in the first preset range corresponding thereto, to obtain the gravity anomaly surface of the first region corresponding to the sampling point, wherein k is a positive integer and the sampling point is the center point of the first preset range corresponding thereto; and substituting the coordinate of the sampling point into the gravity anomaly surface of the first region corresponding to the sampling point to obtain the field value of the first region of the sampling point.

Alternatively, the first reference sampling point is a sampling point with a distance of m units in the x-axis direction from the sampling point corresponding to the first pre-set region;

and/or, the first reference sampling point is a sampling point with a distance of m units in the y-axis direction from the sampling point corresponding to the first pre-set region;

wherein, m=1, 2, K, i;

Alternatively, the method may further comprise:

determining a second pre-set range corresponding to each sampling point in the target region, wherein the first pre-set range and the second pre-set range corresponding to the same sampling point are different;

obtaining a second regional field value of sampling points within the second pre-set range corresponding to each sampling point using a surface fitting method based on coordinates and field values of the sampling points;

traversing the target region, and obtaining a second regional gravity anomaly of the target region according to the second regional field value of the sampling point in the target region;

obtaining a second residual gravity anomaly of the target region according to the Bouguer gravity anomaly and the second regional gravity anomaly;

integrating the first residual gravity anomaly and the second residual gravity anomaly to obtain a third residual gravity anomaly of the target region.

Alternatively, "obtaining a second regional field value of a sampling point using a surface fitting method based on coordinates and a field value of the sampling point within the second pre-set range corresponding to each sampling point" may comprise:

performing surface fitting based on the coordinates and a field value of the sampling point and the coordinates and field values of k second reference sampling points around the sampling point in the second preset range corresponding thereto, to obtain the gravity anomaly surface of the second region corresponding to the sampling point, wherein k is a positive integer and the sampling point is the center point of the second pre-set range corresponding thereto;

substituting the coordinate of the sampling point into the gravity anomaly surface of the second region corresponding to the sampling point to obtain the field value of the second region of the sampling point.

Alternatively, the first reference sampling point is a sampling point with a distance of m units in the x-axis direction from the sampling point corresponding to the first preset region; and/or, the first reference sampling point is a sampling point with a distance of m units in the y-axis direction from the sampling point corresponding to the first pre-set region;

the second reference sampling point is a sampling point with a distance of m units in the x-axis direction from the sampling point corresponding to the second pre-set region; and/or, the second reference sampling point is a sampling point with a distance of m units in the y-axis direction from the sampling point corresponding to the second pre-set region;

wherein, m=1, 2, K, i; n=2m.

An apparatus for obtaining residual gravity anomaly provided by an example of the present invention comprises a first acquisition module, a first determination module, a second acquisition module, a third acquisition module and a fourth acquisition module;

the first acquisition module is configured to acquire Bouguer gravity anomaly in a target region, wherein the Bouguer gravity anomaly comprises coordinates and field values of a plurality of sampling points in the target region;

the first determination module is configured to determine a first pre-set range corresponding to each sampling point in the target region;

the second acquisition module is configured to obtain a first regional field value of sampling points in the first pre-set range corresponding to each sampling point by using a surface fitting method based on coordinates and field values of the sampling points;

the third acquisition module is configured to traverse the target region and obtain a first regional gravity anomaly of the target region according to a first regional field value of sampling points in the target region; and the fourth acquisition module is configured to obtain a first residual gravity anomaly of the target region according to the Bouguer gravity anomaly and the first regional gravity anomaly.

Alternatively, the second acquisition module is configured to:

perform surface fitting based on the coordinates and a field value of the sampling point, and the coordinates and field values of k first reference sampling points around the sampling point in the first preset range corresponding thereto, to obtain the gravity anomaly surface of the first region corresponding to the sampling point, wherein k is a positive integer and the sampling point is the center point of the first pre-set range corresponding thereto; and substitute the coordinate of the sampling point into the gravity anomaly surface of the first region corresponding to the sampling point to obtain the field value of the first region of the sampling point.

Alternatively, the apparatus may further comprise a second determination module, a fifth acquisition module and a sixth acquisition module the second determination module is configured to determine a second pre-set range corresponding to each sampling point in the target region, wherein the first pre-set range and the second pre-set range corresponding to the same sampling point are different;

the fifth acquisition module is configured to obtain second regional field values of sampling points in the second pre-set range corresponding to each sampling point by using a surface fitting method based on coordinates and field values of the sampling points;

the third acquisition module is further configured to traverse the target region and obtain a second regional gravity anomaly of the target region according to the second regional field value of sampling points in the target region;

the fourth acquisition module is further configured to obtain a second residual gravity anomaly of the target region according to the Bouguer gravity anomaly and the second regional gravity anomaly; and the sixth acquisition module is configured to integrate the first residual gravity anomaly and the second residual gravity anomaly to obtain a third residual gravity anomaly of the target region.

Alternatively, the fifth acquisition module is specifically configured to:

perform surface fitting based on the coordinates and a field value of the sampling point and the coordinates and field values of k second reference sampling points around the sampling point in the second preset range corresponding thereto, to obtain the gravity anomaly surface of the second region corresponding to the sampling point, wherein k is a positive integer and the sampling point is the center point of the second pre-set range corresponding thereto; and substitute the coordinate of the sampling point into the gravity anomaly surface of the second region corresponding to the sampling point to obtain the field value of the second region of the sampling point.

Compared with the prior art, the present invention has at least the following advantages:

With the method and the apparatus for obtaining residual gravity anomaly provided by the examples of the present invention, after obtaining the Bouguer gravity anomaly in the target region, the regional field value of the sampling point of the pre-set region is obtained by using a surface fitting method according to the coordinates and field values of the sampling point in a local pre-set region of the target region. According to the regional field values of sampling points in the target region, a regional gravity anomaly of the target region is obtained. According to Bouguer gravity anomaly and regional gravity anomaly of the target region, a residual gravity anomaly of the target region is obtained. Since influence of regional gravity anomaly on a local region can be regarded as an N-order surface, i.e., coordinates and field values of the sampling points in the local region can be regarded as falling in a same N-order surface, regional field values of the sampling points obtained by local surface fitting method based on coordinates and field values of local sampling points in a target region have higher precision and accuracy, and the regional gravity anomaly in a target region corresponds to real situation much better, which renders a more precise residual gravity anomaly obtained according to the Bouguer gravity anomaly and the regional gravity anomaly, and thus the underground geological bodies can be accurately predicted.

BRIEF DESCRIPTION OF THE DRAWINGS

In order to explain the embodiments of the present invention or the technical solutions in the prior art more clearly, the drawings used in the description of the embodiments or the prior art will be briefly introduced hereinafter. Apparently, the drawings in the following description are only some embodiments of the application. For those ordinary skilled in the art, other drawings can be obtained according to these drawings without inventive effort.

FIG. 4 is a schematic diagram of regional gravity anomaly extracted by the method for obtaining residual gravity anomaly provided by a specific embodiment of the present invention;

FIG. 5 is a schematic flow chart of another method for obtaining residual gravity anomaly provided by an embodiment of the present invention;

FIG. 6 is a schematic diagram of a first pre-set region and a first reference sampling point corresponding to a sampling point according to a specific embodiment of the present invention.

FIG. 7 is a schematic flow chart of a further method for obtaining residual gravity anomaly according to an embodiment of the present invention;

FIG. 8 is a schematic diagram of a second pre-set region and a second reference sampling point corresponding to a sampling point according to a specific embodiment of the present invention.

FIG. 9b is a schematic diagram of the forward gravity field of the geological bodies in the model shown in FIG. 9a;

DETAILED DESCRIPTION OF THE INVENTION

Figure 1:
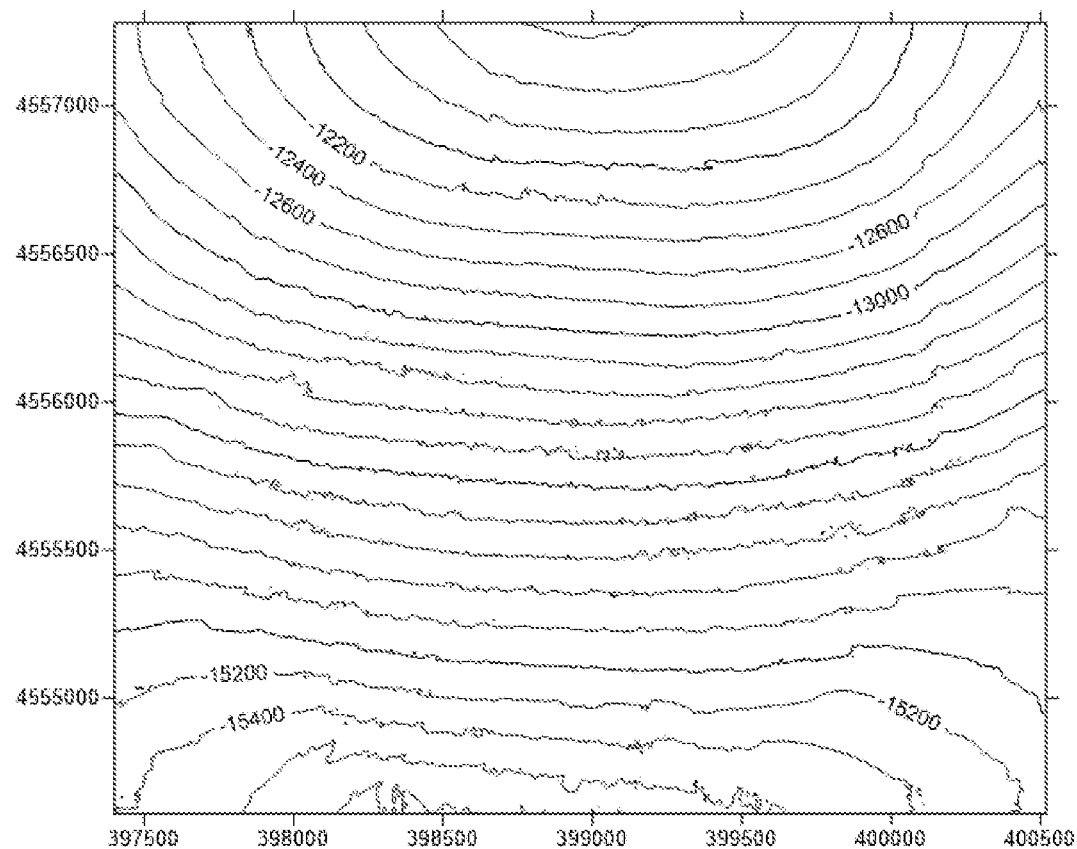
FIG. 1 is a schematic diagram of regional gravity anomaly extracted by a conventional nonlinear method.

In order to enable those skilled in the art to better understand the technical solutions of the present invention, the technical solutions in the embodiments of the present invention will be described clearly and completely with reference to the drawings in the embodiments of the present invention hereinafter. Apparently, the described are only a part but not all of the embodiments of the present invention. Other embodiments obtained by those ordinary skilled in the art without inventive step shall fall within the scope of the present invention.

For ease of understanding, several technical terms involved in the embodiments of the present invention will be interpreted firstly.

Bouguer gravity anomaly refers to the gravity value obtained by the observation results of gravimeter after necessary processing such as latitude correction, height correction, intermediate layer correction, terrain correction, tide correction, etc.

Residual gravity anomaly refers to the gravity anomaly change caused by the density anomaly in the target region.

Regional gravity anomaly refers to the gravity field obtained after removing the residual gravity anomaly from Bouguer gravity anomaly.

The field value of each sampling point in the regional gravity anomaly is the regional field value of the sampling point.

It can be understood that in the embodiments of the present invention, the Bouguer gravity anomaly can be regarded as the superposition of the residual gravity anomaly and the regional gravity anomaly.

Residual gravity anomaly can indicate gravity anomaly changes caused by density anomaly in the target region to predict geological bodies in the target region. At present, the commonly used extraction methods of residual gravity anomaly can be classified into filtering method, trend prediction method, peeling method and nonlinear method. However, these residual gravity anomaly extraction methods have the following problems respectively.

There are two problems in the filtering method. One is that the filter is usually subject to side-lobe effect, resulting in errors in the extraction of residual gravity anomaly and false anomaly in the residual gravity anomaly. The other is that when the filter is not in zero phase, the extreme points of residual gravity anomaly will shift. These two problems make great influence on the extraction results of residual gravity anomaly, especially in microgravity. Trend prediction method predicts regional anomaly in the data, but cannot accurately predict the influence of near source field, which will also lead to false anomaly in residual gravity anomaly. The peeling method is to obtain a forward field representing the gravity field of the external mass in the target layer under the condition that a better geological density model can be established, and then extract the forward field from the observed gravity field to obtain the residual field. However, the establishment of geological density model requires more prior knowledge, and the accuracy cannot be guaranteed.

The principle of the nonlinear method is as follows:

Five sampling points A, B, C, D and E within the target region with an interval of d are taken to obtain the residual anomaly value of sampling point C. For convenience of explanation, the field values of sampling points A, B, C, D and E are subsequently expressed by A, B, C, D and E respectively.

Let half difference S be:

$$S = C - \frac{B+D}{2}$$

And define R and T as follows:

$$R = \frac{T}{S}$$
$$T = (B - B2) + (C - C2) + (D - D2)$$

Wherein, B2, C2 and D2 are the field values of the projection points of sampling points B, C and D on the line connecting sampling point A and sampling point E respectively.

When 0≤R≤2, it was determined that single peak anomaly occurred at sampling point C, and the residual gravity anomaly value at point C was defined as:

$$\frac{2(B+D)}{3} - \frac{A+E}{6}$$

When R<0, it was determined that multi-peak anomaly occurred at sampling point C, and the residual gravity anomaly value at point C was defined as:

$$\frac{C}{2} + \frac{B+D}{4}$$

When R is another value, the remaining anomaly interval is greater than interval x.

Then, the residual gravity anomaly with interval d in the target region can be extracted from the Bouguer gravity anomaly data by traversing the sampling points in the target region.

In practical applications, residual gravity anomalies with interval less than or equal to d are extracted from the Bouguer gravity anomaly data firstly, then residual gravity anomalies with interval of 2d are extracted from the Bouguer gravity anomaly data excluding residual gravity anomaly with interval less than or equal to d, and so on, and iteration as such is conducted step by step until residual gravity anomalies with interval of pre-set interval threshold are proposed from the Bouguer gravity anomaly data. Then, the residual gravity anomalies at different intervals extracted can be integrated to obtain the residual gravity anomaly at different scales in the target region.

From the above, it can be seen that the residual gravity anomaly value of the sampling point can be obtained by nonlinear method in a defined way, but the method cannot describe the real residual gravity condition accurately, which will cause an error in the extracted residual gravity anomaly compared with the real condition, resulting in distortion in the residual gravity anomaly which makes it hard to accurately predict the geological bodies.

The problems of the nonlinear method will be explained in detail with specific scenes hereinafter. In practical application, the regional gravity anomaly obtained after extracting the residual gravity anomaly by the existing nonlinear method is shown in FIG. 1. Research of the inventors of the present invention discovered that the regional gravity anomaly can be regarded as a smooth curved surface locally in practical application. However, as can be seen from FIG. 1, the existing nonlinear method has errors in extracting the residual gravity anomaly, so that the extracted regional gravity anomalies have local jitters, residual gravity anomalies still exist, and the residual gravity anomalies cannot be accurately extracted.

To address this issue, embodiments of the present invention provide a method and an apparatus for obtaining residual gravity anomaly. The coordinates and field values of sampling points in a local range in a target region are used to fit a regional gravity anomaly curved surface. Research by the inventors of the present invention has found that the regional gravity anomaly in the target region can be regarded as an N-order curved surface (N is a positive integer) related to the coordinate value and field value of said sampling point in view of the local region. The corresponding regional gravity anomaly curved surface is fitted to each sampling point in the target region, so that the accurate regional field values of the sampling points can be obtained, thus a more accurate regional gravity anomaly in the target region is available. Residual gravity anomaly with higher precision and accuracy of the region can be obtained by extracting gravity anomaly from Bouguer gravity anomaly, thus underground geological bodies can be accurately predicted.

Based on the above ideas, in order to make the above objects, features and advantages of the present invention more obvious and understandable, detailed description of the embodiments of the present invention will be made hereinafter with reference to the drawings.

Figure 2:
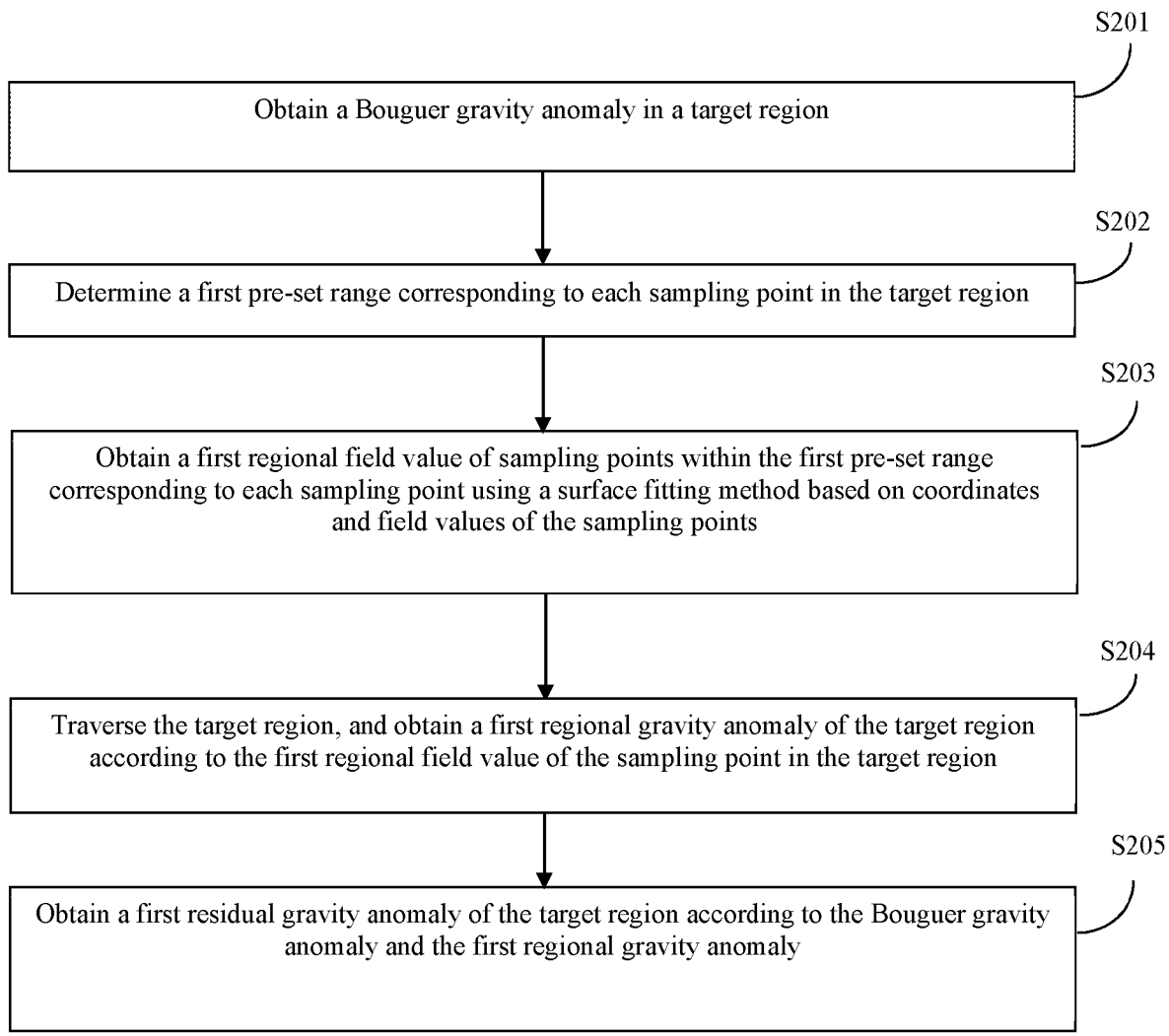
FIG. 2 is a schematic flow chart of a method for obtaining residual gravity anomaly provided by an embodiment of the present invention.

Referring to FIG. 2, a schematic flow chart of a method for obtaining residual gravity anomaly provided by an embodiment of the present invention is shown.

The method for obtaining residual gravity anomaly provided by the embodiments of the present invention comprises the following steps S201-S205.

S201: Obtaining a Bouguer gravity anomaly in a target region.

Understandably, the target region is the region where the residual gravity anomaly is to be extracted. The Bouguer gravity anomaly comprises coordinates and field values of a plurality of sampling points in the target region. Those skilled in the art can obtain the Bouguer gravity anomaly in the target region by any existing method according to the real situation, which will not be enumerated herein.

It should be noted here that in the embodiments of the present invention, Bouguer gravity anomaly can be regarded as a superposition of residual gravity anomaly and regional gravity anomaly. If the Bouguer gravity anomaly is g(x, y), wherein (x, y) is the ground coordinate of the sampling point, then $g(x,y)=g_l+g_r$, wherein $g_l$ is the residual gravity anomaly at the sampling point, and $g_r$ is the regional gravity anomaly at the sampling point.

S202: Determining a first pre-set range corresponding to each sampling point in the target region, wherein the sampling point is located in a first pre-set range corresponding thereto.

How to determine the first pre-set range corresponding to each sampling point in detail will be described later and hence is omitted herein.

S203: Obtaining a first regional field value of a sampling point using a surface fitting method based on coordinates and field values of the sampling points within the first pre-set range corresponding to each sampling point.

In the embodiments of the present invention, the influence of the regional gravity anomaly on a local region is regarded as an N-order curved surface related to coordinate values and field values, and N is a positive integer. Based on the coordinate values and field values of the sampling points in the first pre-set range corresponding to each sampling point (i.e. the local region corresponding to the sampling point), the gravity anomaly surface of the first region in the first pre-set range can be obtained by a surface fitting method. Using the coordinates and field values of the sampling points in the local region, the gravity anomaly surface of the first region obtained through the surface fitting method has better precision and accuracy, which conforms to reality better.

Understandably, the coordinates and the regional anomaly field values of the sampling point should also fall on the gravity anomaly curved surface of the first region. Therefore, according to the gravity anomaly surface of the first region corresponding to the sampling point and the coordinate value of the sampling point, a first region field value of the sampling point can be obtained with higher precision and accuracy and better conforming to reality.

It should also be noted that the larger the order of the curved surface is, the larger its curvature will be, which will cause the fitted gravity anomaly curved surface in the first region to be inconsistent with the real situation. Therefore, in practical application, it is necessary to determine the order of the curved surface fitted when fitting the curved surface according to the real situation, which is not listed here.

S204: Traversing the target region and obtaining a first regional gravity anomaly of the target region according to the first regional field value of the sampling point in the target region.

Understandably, the first region field value of each sampling point can be obtained by traversing the sampling points used in the target region and using steps S202-S203. According to the first region field value of each sampling point in the target region, the first regional gravity anomaly of the target region can be obtained.

S205: Obtaining a first residual gravity anomaly of the target region according to the Bouguer gravity anomaly and the first regional gravity anomaly.

Because the Bouguer gravity anomaly can be regarded as a superposition of residual gravity anomaly and regional gravity anomaly, in one embodiment of the present invention, the first residual gravity anomaly in the target region can be obtained by subtracting the gravity anomaly in the first region from the Bouguer gravity anomaly. In addition, since the obtained gravity anomaly in the first region has higher precision and accuracy and accords with the real region field situation, the first residual gravity anomaly obtained by subtracting the gravity anomaly in the first region from the Bouguer gravity anomaly is also more accurate.

At present, there is also a residual anomaly extraction method, which uses the coordinates and field values of sampling points in the target region and uses the surface fitting method to predict the regional gravity anomaly in the whole target region. The fitted regional gravity anomaly is subtracted from Bouguer gravity anomaly to obtain the residual gravity anomaly in the target region. However, this residual anomaly extraction method predicts the regional gravity anomaly in the target region as a whole, but ignores the influence of the near-source region on the target region, and cannot extract the regional gravity anomaly caused by the near-source region from the residual gravity anomaly, and still leads to residual regional gravity anomaly existing in the extracted residual gravity anomaly, resulting in inaccurate prediction of underground geological bodies later. On the other hand, in the embodiments of the present invention, the coordinates and field values of sampling points in the local small region are used to fit curved surfaces to obtain the regional gravity anomaly in the local small region, and the regional gravity anomaly caused by the near-source region can be subtracted, so that the residual regional gravity anomaly in the finally obtained residual gravity anomaly is reduced, and the obtained residual gravity anomaly is more accurate.

In the embodiments of the present invention, after obtaining the Bouguer gravity anomaly in the target region, the regional field value of the sampling point of the pre-set region is obtained by using a surface fitting method according to the coordinates and field values of the sampling point in a local pre-set region of the target region. According to the regional field values of sampling points in the target region, a regional gravity anomaly of the target region is obtained. According to Bouguer gravity anomaly and the obtained regional gravity anomaly of the target region, a residual gravity anomaly of the target region is obtained. Since influence of regional gravity anomaly on a local region can be regarded as an N-order surface, i.e., coordinates and field values of the sampling points in the local region can be regarded as falling in a same N-order surface, hence regional field values of the sampling points obtained by local surface fitting method based on coordinates and field values of local sampling points in a target region have higher precision and accuracy, and the regional gravity anomaly in a target region conforms to real situation much better, which renders a more precise residual gravity anomaly obtained according to the Bouguer gravity anomaly and the regional gravity anomaly, and thus the underground geological body can be accurately predicted.

Figure 3:
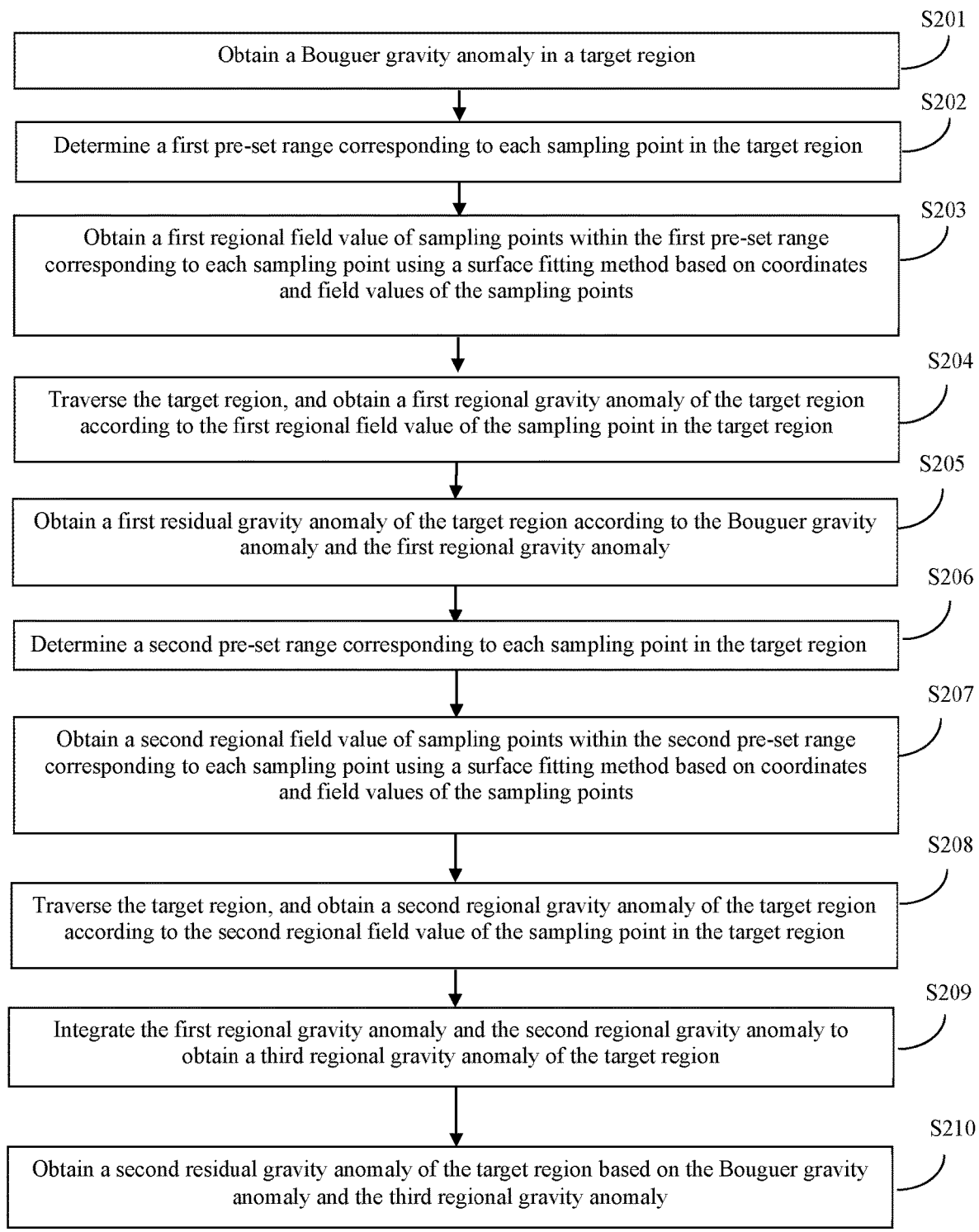
FIG. 3 is a schematic flow chart of another method for obtaining residual gravity anomaly provided by an embodiment of the present invention.

Referring to FIG. 3, a schematic flow chart of another method for obtaining residual gravity anomaly provided by an embodiment of the present invention is shown. Compared with FIG. 2, this figure provides more specifically a method to obtain residual gravity anomaly.

The method for obtaining residual gravity anomaly provided by the embodiment of the invention can extract residual gravity anomaly with different scales from Bouguer gravity anomaly. Specifically, in addition to the above steps S201-S205, the following steps S206-S210 may further be comprised.

S206: Determining a second pre-set range corresponding to each sampling point in the target region, wherein the sampling point is in the corresponding second pre-set range, and the first pre-set range and the second pre-set range corresponding to the same sampling point are different.

A detailed description on how to determine the second pre-set range corresponding to each sampling point will be given later and hence omitted herein.

S207: Based on coordinates and field value of a sampling point within the second pre-set range corresponding to each sampling point, obtaining a second regional field value of a sampling point using a surface fitting method.

In the embodiments of the present invention, the order of the curved surface fitted in the curved surface fitting in step S207 is the same as that in step S203, that is, the regional gravity anomaly curved surface is fitted using the same method in step S203 and step S207 and hence detailed description will not be repeated herein.

Similarly, the coordinate values and field values of the sampling points in the second pre-set range corresponding to each sampling point can be used to obtain the second regional gravity anomaly surface in the second pre-set range by a surface fitting method, and the coordinate values and field values of the sampling points should also fall in the second regional gravity anomaly surface. Therefore, the second region field value of the sampling point can be obtained according to the gravity anomaly surface of the second region corresponding to the sampling point and the coordinate value of the sampling point.

S208: Traversing the target region, and obtaining a second regional gravity anomaly of the target region according to the second regional field value of the sampling point in the target region.

Traversing the target region, the second region field value of each sampling point can be obtained by steps S206-S207. Then, the gravity anomaly in the second region of the target region can be obtained according to the field values in the second region of the sampling points in the target region.

It should also be noted that since the first pre-set range and the second pre-set range corresponding to the same sampling point are different, the coordinates and field values of specific sampling points in the first pre-set range and the coordinates and field values of sampling points in the second pre-set range can be used to fit regional gravity anomaly of different scales respectively, thereby extracting a plurality of residual gravity anomaly of different scales from Bouguer gravity anomaly and extracting residual gravity anomaly of different scales.

S209: Obtaining a second residual regional gravity anomaly of the target region according to the Bouguer gravity anomaly and the second regional gravity anomaly of the target region.

In the embodiments of the present invention, regional gravity anomaly generated by different scales of near-source region targets affecting the gravity field of the target region are extracted from Bouguer gravity anomaly, and residual gravity anomaly of different scales, namely second residual gravity anomaly, can be obtained.

S210: Obtaining a third residual gravity anomaly of the target region by integrating the first gravity anomaly and the second regional gravity anomaly.

Understandably, the third residual gravity anomaly comprises a plurality of residual gravity anomaly at different scales.

The above advantages of embodiments of the present invention will be described in detail with reference to specific scenes hereinafter. By using the method for obtaining residual gravity anomaly provided by the embodiments of the present invention, the obtained regional gravity anomaly is shown in FIG. 4. As can be seen from FIG. 4, by using the method for obtaining the residual gravity anomaly provided by the embodiments of the present invention, the obtained regional gravity anomaly curve is smoother and conforms to the real regional gravity anomaly. The regional gravity anomaly is extracted from the Bouguer gravity anomaly, so that the residual gravity anomaly in the Bouguer gravity anomaly can be more accurately extracted, the influence of the residual regional gravity anomaly on the residual gravity anomaly is avoided, so that the underground geological bodies can be accurately predicted. Compared with FIGS. 1 and 4, the method for obtaining the residual gravity anomaly provided by the embodiments of the present invention can extract the residual gravity anomaly more accurately than the existing nonlinear method, and the method for obtaining the residual gravity anomaly provided by the embodiments of the present invention renders a more precise residual gravity anomaly obtained according to the Bouguer gravity anomaly and the regional gravity anomaly.

In the embodiments of the present invention, the following describes how to determine the first pre-set range and the second pre-set range, and how to obtain the first region field value and the second region field value by a curved surface fitting method based on the first reference sampling points in the first pre-set range and the second reference sampling points in the second pre-set range.

Referring to FIG. 5, a schematic flow diagram of another method for obtaining residual gravity anomaly provided by an embodiment of the present invention is shown. Compared with FIG. 2 or FIG. 3, this figure provides a more specific method to obtain residual gravity anomaly.

In an embodiment of the present invention, the above step S203 may specifically comprise the following steps S2031-S2032.

In step S2031, surface fitting is performed based on the coordinate and field value of a sampling point and the coordinates and field values of k first reference sampling points around the sampling point in the first preset range corresponding thereto, to obtain the gravity anomaly surface of the first region corresponding to the sampling point. Where k is a positive integer, and the sampling point is the center point of the first pre-set range corresponding thereto.

In step S2032, the coordinate of the sampling point is substituted into the gravity anomaly surface of the first region corresponding to the sampling point to obtain the field value of the first region of the sampling point.

Understandably, the first pre-set range corresponding to the sampling point in the target region may be a region surrounded by k first reference sampling points corresponding to the sampling point in the target area centered on the sampling point.

In a possible implementation of the embodiments of the present invention, the first reference sampling point is a sampling point with m units distance in the x-axis direction from the sampling point corresponding to the first pre-set region; and/or the first reference sampling point is a sampling point with m units distance in the y-axis direction from the sampling point corresponding to the first pre-set region. Wherein, m=1, 2, K, i. Those skilled in the art can specifically set the value of unit distance according to the real situation, which will not be listed herein.

Taking m as 1 and 2 as an embodiment, the first pre-set region is shown in FIG. 6, and the first reference sampling point (i.e. the dot in FIG. 6) is the sampling point with a distance of 1 unit or 2 units distance d in the x-axis and/or y-axis from the sampling point in the center of the first pre-set region (i.e. the triangular points in FIG. 6).

In the embodiments of the present invention, the regional gravity anomaly in the first pre-set range can be regarded as a smooth curved surface, which can be obtained by surface fitting method according to the coordinates and field values of sampling points in the first pre-set range, that is the first regional gravity anomaly curved surface corresponding to the sampling points in the center of the first pre-set range. The coordinates of the sampling point of the center and the regional gravity field value are also located in the first regional gravity anomaly surface, and the regional gravity anomaly at the sampling point can be obtained by substituting the coordinates of the sampling point into the corresponding first regional gravity anomaly surface.

As an embodiment, the coordinates and field values of the sampling points in the first pre-set range can be used to fit a second order surface to obtain the first regional gravity anomaly surface corresponding to the sampling points in the center of the first pre-set range. Specifically, the regional gravity anomaly $g_r$ of the first reference sampling point within the first pre-set range can be expressed as:

$$g_r = a_0 + a_1 \Delta x + a_2 \Delta y + a_3 \Delta x \Delta y + a_4 \Delta x^2 + a_5 \Delta y^2 \quad (1)$$

Wherein, $\Delta x$ and $\Delta y$ are the distances between the first reference sampling point and the center point of the first preset range in the x-axis and y-axis directions, respectively; and $a_0$, $a_1$, $a_2$, $a_3$, $a_4$ and $a_5$ are coefficients.

Then, the sum of squared errors of the first reference sampling point can be expressed as:

$$E(g, g_r) = \sum_i \sum_j (g(i, j) - g_r(i, j))^2 \quad (2)$$

According to the above equations (1) and (2), the coordinates and field values of the first reference sampling points and the center sampling point are substituted into the equations to obtain the coefficients $a_0$, $a_1$, $a_2$, $a_3$, $a_4$ and $a_5$ by using the least square method, so that the regional gravity anomaly surface in the first pre-set range, that is, the first regional gravity anomaly surface corresponding to the center sampling point in the first pre-set range can be obtained.

It should be noted that the method of surface fitting method using the above equation (1) to obtain the regional gravity anomaly surface is only an embodiment. In real applications, those skilled in the art can select other surface equations, such as orthogonal polynomials, to perform surface fitting to obtain the regional gravity anomaly surface without being limited to the second order of the surface equation mentioned above, hence unnecessary details thereof will not be given herein.

Further referring to FIG. 7, a schematic flow diagram of another method for obtaining residual gravity anomaly provided by an embodiment of the present invention is shown. Compared with FIG. 2, FIG. 3 or FIG. 5, FIG. 7 provides a more specific method for obtaining residual gravity anomaly.

In an embodiment of the present invention, the above step S207 may specifically comprise the following steps S2071 to S2072.

In step S2071, a surface fitting is performed based on the coordinate and field value of a sampling point and the coordinates and field values of k second reference sampling points around the sampling point in a second preset range corresponding to the sampling point, to obtain the gravity anomaly surface of the second region corresponding to the sampling point. Wherein k is a positive integer, and the sampling point is the center point of the second pre-set range corresponding thereto.

In step S2072, the coordinate of the sampling point is substituted into the gravity anomaly surface of the second region corresponding to the sampling point to obtain the field value of the second region of the sampling point.

Similarly, in the embodiments of the present invention, the second pre-set range corresponding to the sampling point in the target region may be a region in the target area centered at the sampling point and surrounded by k second reference sampling points corresponding to the sampling point. The curved surface fitting method in step S2071 is similar to that in step S2031 which can be referred to for details, hence detailed description thereof will not be repeated herein.

In a possible implementation mode of the embodiments of the present invention, in order to obtain regional gravity anomaly of different scales, the first reference sampling point is a sampling point with a distance of m units in the x-axis direction away from the sampling point corresponding to the first pre-set region; and/or the first reference sampling point is a sampling point with a distance of m units in the y-axis direction away from the sampling point corresponding to the first pre-set region. The second reference sampling point is a sampling point with a distance of m units in the x-axis direction away from the sampling point corresponding to the second pre-set region; and/or the second reference sampling point is a sampling point with a distance of m units in the y-axis direction away from the sampling point corresponding to the second pre-set regions. Here, m=1, 2, K, i , n=2m.

Taking m as 1 and 2, the first pre-set region is shown in FIG. 6, and the first reference sampling point (i.e. the dot in FIG. 6) is the sampling point of 1 unit or 2 units distance d in the x-axis and/or y-axis away from the sampling point in the center of the first pre-set region (i.e. the triangular points in FIG. 6). The second pre-set region is shown in FIG. 8, and the second reference sampling point (i.e., the dot in FIG. 8) is a sampling point of 2 or 4 units distance d in the x-axis and/or y-axis away from the sampling point in the center of the second pre-set region (i.e., the triangular points in FIG. 8).

A method for obtaining residual gravity anomaly provided by a specific embodiment of the present invention will be described in detail with reference to a specific scene hereinafter.

Firstly, Bouguer gravity anomaly in the target region is obtained. Then, for each sampling point of Bouguer gravity anomaly, a first pre-set region is determined, which is formed by first reference sampling points in the target region with the sampling point as the center and having a 1 unit distance from the sampling point in the x-axis or y-axis.

Secondly, the coordinates and field values of the first reference sampling point are used to fit the second-order curved surface to obtain the first regional gravity anomaly curved surface of the first pre-set region, and then the coordinate of the center sampling point of the first pre-set region is substituted into the first regional gravity anomaly curved surface to obtain the first region field value of the center sampling point. Research by the inventors of the present invention has found that, from a local region view, the regional gravity anomaly in the target region can be regarded as an N-order curved surface related to the coordinate values and field values of the sampling points. A corresponding regional gravity anomaly curved surface is fitted for each sampling point in the target region, so that an accurate regional field value of the sampling point can be obtained, which renders a more accurate regional gravity anomaly in the target region.

Thirdly, the above steps are performed for each sampling point in the traversing target region to obtain the first region field values of each sampling point. The coordinates of each sampling point and the field values of the first region are integrated to obtain the gravity anomaly of the first region of the target region.

Then, the distance between the sampling point and the reference sampling point is increased, and for each sampling point of Bouguer gravity anomaly, a second pre-set region is determined, which is formed by second reference sampling points in the target region with the sampling point being the center and having a 2 unit distance from the sampling point in the x-axis or y-axis. Using the coordinates and field values of the second reference sampling point to fit the second-order curved surface to obtain the second-regional gravity anomaly curved surface of the second pre-set region, and substituting the coordinates of the center sampling point of the second pre-set region into the second-regional gravity anomaly curved surface to obtain the second-region field values at different scales of the center sampling point. The coordinates of each sampling point and the field values of the second region are integrated to obtain gravity anomaly of the second region at different scales of the target region.

Then, the distance between the sampling point and the reference sampling point is increased to 4 units distance, and the second-order curved surface is fitted again to obtain the regional field values at different scales of the center sampling point and the regional gravity anomaly at different scales of the target region.

Finally, the regional gravity anomalies at different scales of the target region are integrated, and the regional gravity anomaly at different scales of the target region are extracted from the Bouguer gravity anomaly to obtain the residual gravity anomaly of the target region.

In order to better illustrate the above advantages of the embodiments of the present invention, the following description will be made in conjunction with specific experimental results. In one experiment, a model composed of four geological bodies was designed, of which three were cubes with 50 meters of side length are buried 100 meters underground from their tops to simulate geological bodies causing residual gravity anomaly in the real geological structure. The fourth geological body is a cuboid with its sides of 400 meters, 500 meters and 150 meters respectively to simulate regional gravity anomaly. The density of each geological bodies is 850 kg per cubic meter. The forward gravity field (i.e. simulated Bouguer gravity anomaly) of the model is shown in FIG. 9a, and the forward gravity field (i.e. simulated real gravity anomaly) of the above three geological bodies buried 100 meters underground is shown in FIG. 9b.

Figure 9A:
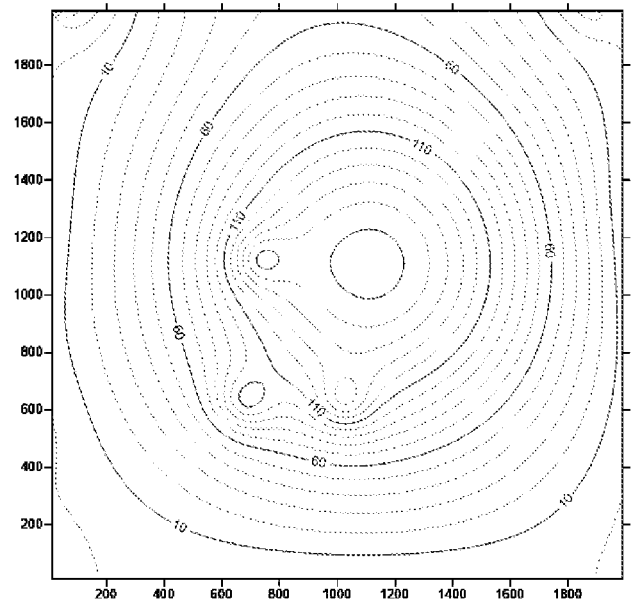
FIG. 9a is a schematic diagram of forward gravity field of an underground structure model.
Figure 9B:
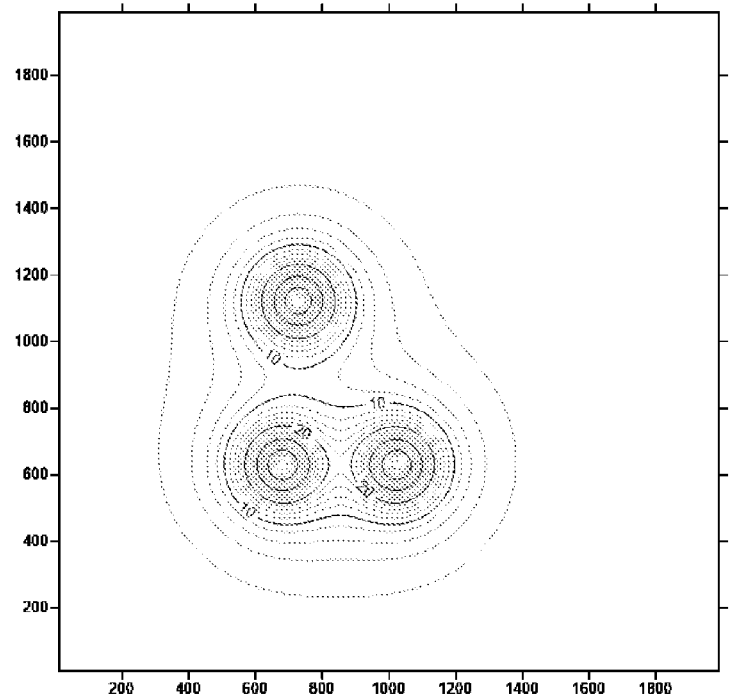
Figure 10A:
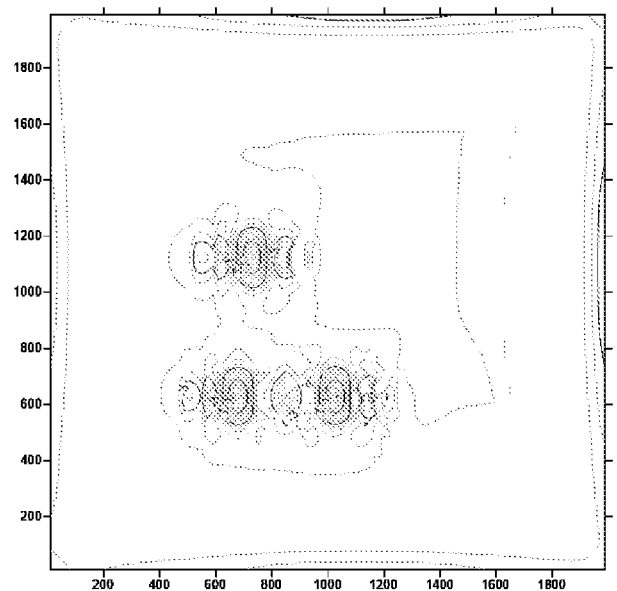
FIG. 10a is a schematic diagram of a gravity field obtained by extracting residual gravity anomaly in the forward gravity field in FIG. 9a using a conventional surface fitting method.
Figure 10B:
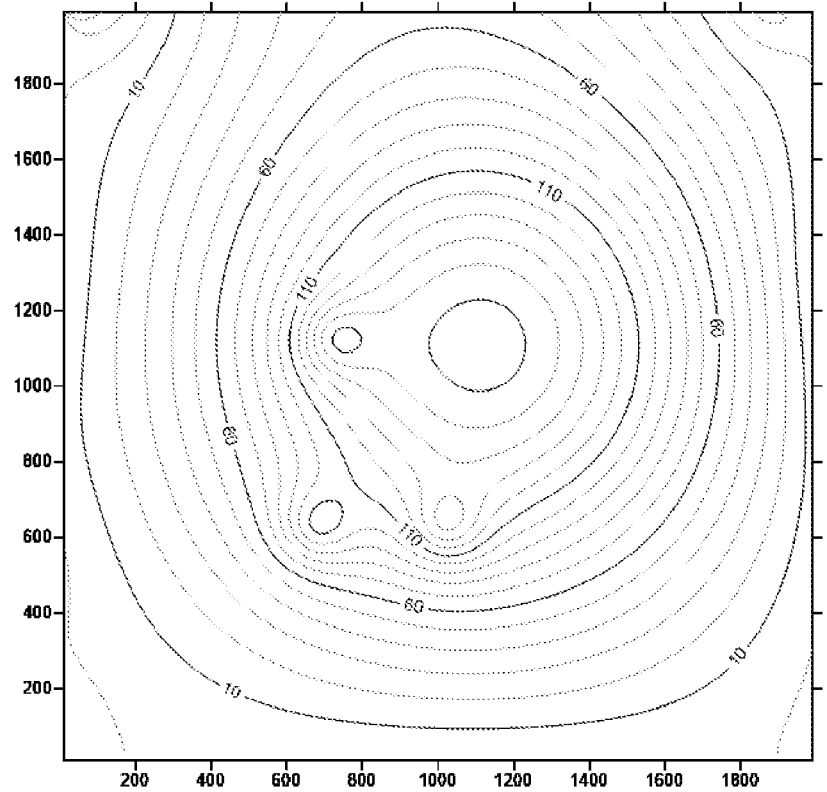
FIG. 10b is a schematic diagram of a gravity field obtained by extracting residual gravity anomaly in the forward gravity field in FIG. 9a using a conventional nonlinear method.
Figure 10C:
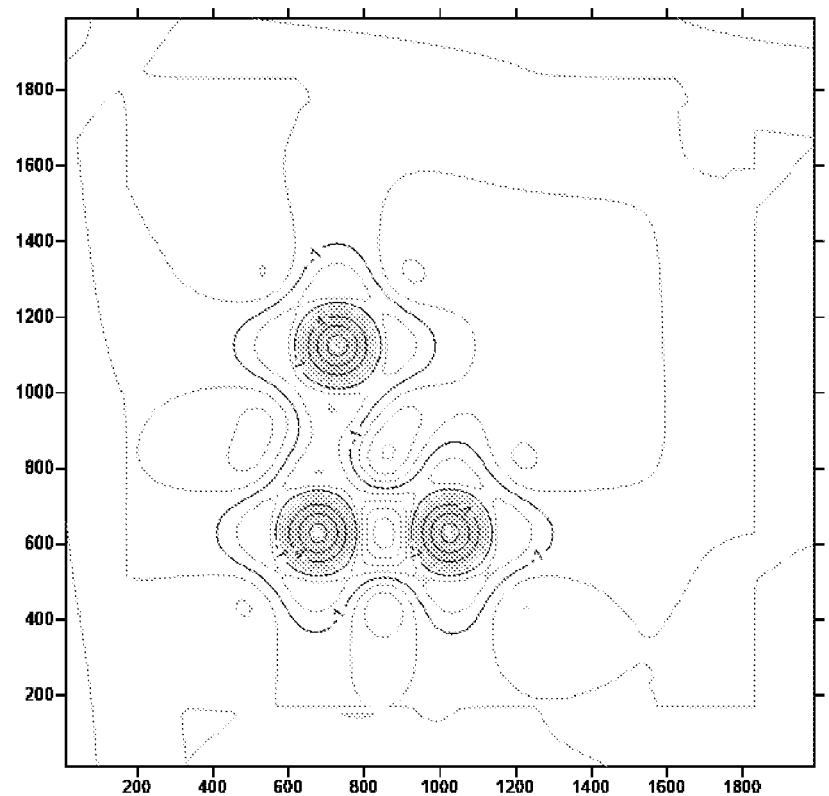
FIG. 10c is a schematic diagram of a gravity field obtain by extracting residual gravity anomaly in that forward gravity field in FIG. 9a by using a method for obtaining residual gravity anomaly provide by a specific embodiment of the present invention.

Then, the residual gravity anomaly in FIG. 9a is extracted by using the existing nonlinear method provided hereinbefore, and the obtained residual gravity anomaly result is shown in FIG. 10a. The residual gravity anomaly in FIG. 10a is extracted by using the existing curved surface fitting method provided above, and the obtained residual gravity anomaly result is shown in FIG. 10b. The method for obtaining the residual gravity anomaly provided by the embodiment of the invention is used to extract the residual gravity anomaly in FIG. 9a, and the obtained residual gravity anomaly result is shown in FIG. 10c. Comparing FIGS. 10a to 10c, it can be seen that the method for obtaining the residual gravity anomaly provided by the embodiments of the present invention is superior to the existing method for extracting the residual gravity anomaly in the expression of the location and shape of the geological body. By using the method for obtaining the residual gravity anomaly provided by the embodiments of the present invention, the residual gravity anomaly obtained according to the Bouguer gravity anomaly and the regional gravity anomaly can be more accurate, so that the underground geological bodies can be accurately predicted.

Based on the method for obtaining residual gravity anomaly provided by the above embodiments, an apparatus for obtaining residual gravity anomaly is further provided by the embodiments of the present invention.

Figure 11:
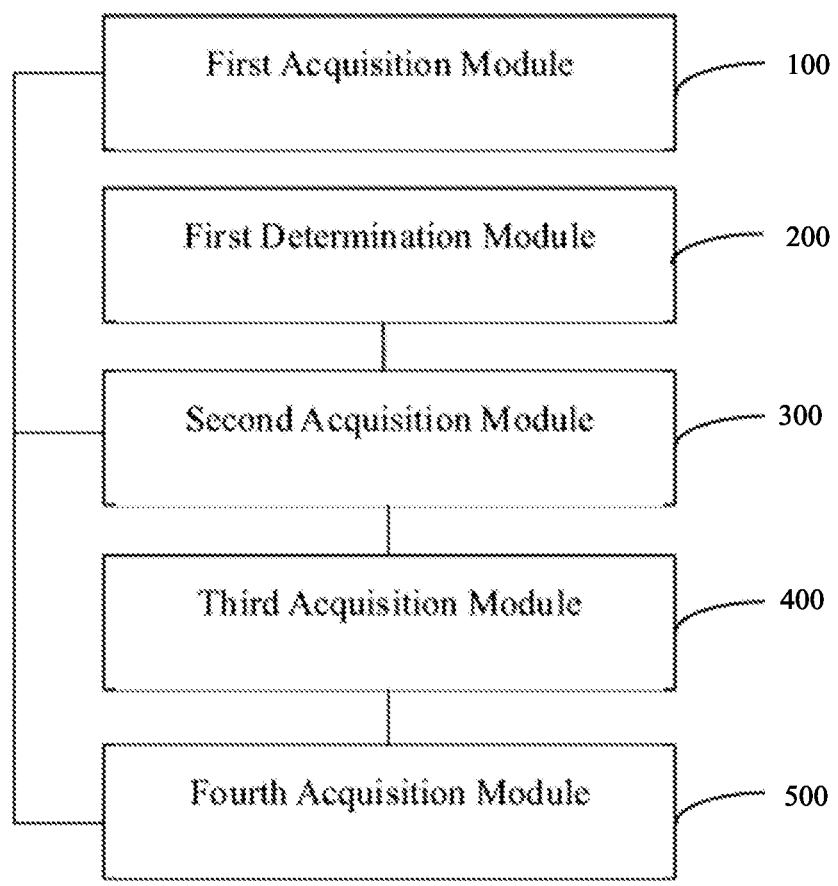
FIG. 11 is a schematic structural diagram of an apparatus for obtaining residual gravity anomaly according to an embodiment of the present invention.

Referring to FIG. 11, a schematic structural diagram of an apparatus for obtaining residual gravity anomaly according to an embodiment of the present invention is shown.

The apparatus for acquiring residual gravity anomaly provided by an embodiment of the present invention comprises a first acquisition module 100, a first determination module 200, a second acquisition module 300, a third acquisition module 400 and a fourth acquisition module 500.

The first acquisition module 100 is configured to acquire Bouguer gravity anomaly in a target region comprising coordinates and field values of a plurality of sampling points in the target region.

The first determination module 200 is configured to determine a first pre-set range corresponding to each sampling point in the target region.

The second acquisition module 300 is configured to obtain a first regional field value of sampling points within the first pre-set range corresponding to each sampling point by using a curved surface fitting method based on the coordinates and field values of the sampling points.

The third acquisition module 400 is configured to traverse the target region and obtain the first regional gravity anomaly of the target region according to the first regional field values of sampling points in the target region.

The fourth acquisition module 500 is configured to obtain a first residual gravity anomaly of the target region according to the Bouguer gravity anomaly and the first regional gravity anomaly.

In a possible implementation of the embodiments of the present invention, the second acquisition module 300 is specifically configured to:

Perform surface fitting based on the coordinates and a field value of the sampling point, and the coordinates and field values of k first reference sampling points around the sampling point in the first preset range corresponding thereto, to obtain the gravity anomaly surface of the first region corresponding to the sampling point, wherein k is a positive integer and the sampling point is the center point of the first pre-set range corresponding thereto; and substitute the coordinate of the sampling point into the gravity anomaly surface of the first region corresponding to the sampling point to obtain the field value of the first region of the sampling point.

As an embodiment, the first reference sampling point is a sampling point with m units distance in the x-axis direction from the sampling point corresponding to the first pre-set region; and/or the first reference sampling point is a sampling point with m units distance in the y-axis direction from the sampling point corresponding to the first pre-set region, wherein, m=1, 2, K, i.

In the embodiments of the present invention, after obtaining the Bouguer gravity anomaly in the target region, the regional field value of the sampling point of the pre-set region is obtained by using a surface fitting method according to the coordinates and field values of the sampling points in a local pre-set region of the target region. Further, according to the regional field values of sampling points in the target region, a regional gravity anomaly of the target region is obtained. Then, according to the Bouguer gravity anomaly and regional gravity anomaly of the target region, a residual gravity anomaly of the target region is obtained. Since influence of regional gravity anomaly on a local region can be regarded as an N-order surface, i.e., coordinates and field values of the sampling points in the local region can be regarded as falling in a same N-order surface, regional field values of the sampling points obtained by local surface fitting method based on coordinates and field values of local sampling points in a target region have higher precision and accuracy, and the regional gravity anomaly in a target region conforms to real situation much better, which renders a more precise residual gravity anomaly obtained according to the Bouguer gravity anomaly and the regional gravity anomaly, and thus the underground geological bodies can be accurately predicted.

Figure 12:
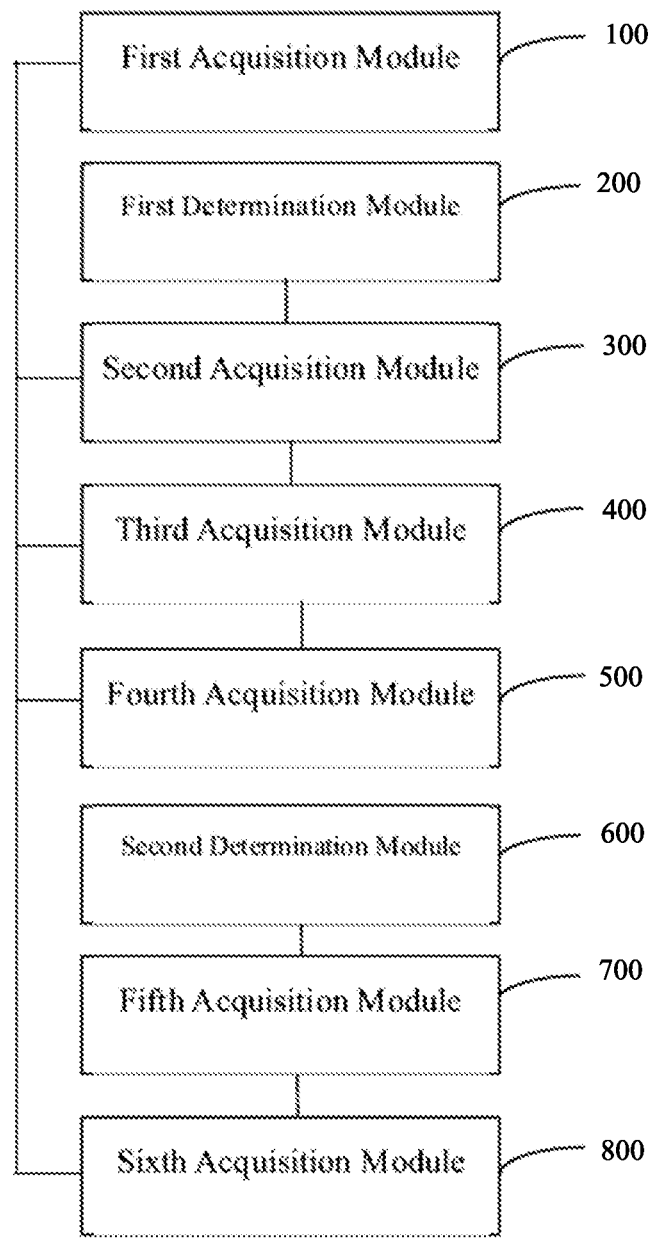
FIG. 12 is a schematic structural diagram of another apparatus for obtaining residual gravity anomaly according to an embodiment of the present invention.

Referring to FIG. 12, a schematic structural diagram of a further apparatus for obtaining residual gravity anomaly according to an embodiment of the present invention is shown. Compared with FIG. 11, this figure provides a more specific apparatus for obtaining residual gravity anomaly.

The apparatus for obtaining residual gravity anomaly provided by the embodiments of the present invention may further comprise, on the basis of FIG. 11, a second determination module 600, a fifth acquisition module 700 and a sixth acquisition module 800.

The second determination module 600 is configured to determine a second pre-set range corresponding to each sampling point in the target region.

The fifth acquisition module 700 is configured to obtain a second regional field value of sampling points in the second pre-set range corresponding to each sampling point by using a curved surface fitting method based on coordinates and field values of the sampling points, wherein the first pre-set range and the second pre-set range corresponding to the same sampling point are different.

The third acquisition module 400 is further configured to traverse the target region and obtain the second regional gravity anomaly of the target region according to the second regional field values of sampling points in the target region.

The fourth acquisition module 500 is further configured to obtain a second residual gravity anomaly of the target region according to the Bouguer gravity anomaly and the second regional gravity anomaly.

The sixth acquisition module 800 is configured to integrate the first residual gravity anomaly and the second residual gravity anomaly to obtain a third residual gravity anomaly in the target region.

In a possible implementation of the embodiments of the present invention, the fifth acquisition module 700 is specifically configured to:

Perform surface fitting based on the coordinates and a field value of the sampling point, and the coordinates and field values of k second reference sampling points around the sampling point in the second preset range corresponding thereto, to obtain the gravity anomaly surface of the second region corresponding to the sampling point, wherein k is a positive integer and the sampling point is the center point of the second pre-set range corresponding thereto; and substitute the coordinate of the sampling point into the gravity anomaly surface of the second region corresponding to the sampling point to obtain the field value of the second region of the sampling point.

As one embodiment, the first reference sampling point is a sampling point with m units distance in the x-axis direction from the sampling point corresponding to the first pre-set region; and/or the first reference sampling point is a sampling point with m units distance in the y-axis direction from the sampling point corresponding to the first pre-set region.

the second reference sampling point is a sampling point with n units distance in the x-axis direction from the sampling point corresponding to the second pre-set region; and/or the second reference sampling point is a sampling point with n units distance in the y-axis direction from the sampling point corresponding to the second pre-set region.

Wherein, m=1, 2, K, i, n=2 m.

It should be noted that various embodiments in the description are described in a progressive manner, each embodiment focusing on the differences from other embodiments, and the same or similar parts between various embodiments can be referred to each other. For the apparatus disclosed in the embodiment, the description thereof is relatively simple because it corresponds to the method disclosed in the embodiment in which the relevant parts can be explained in the detailed description.

It should also be noted that in present invention, relational terms such as first and second, etc., are only used to distinguish one entity or operation from another ones, and do not necessarily require or imply any such real relationship or order between these entities or operations. Moreover, the terms "comprise", "comprising" or any other variations thereof are intended to cover a non-exclusive inclusion, such that a process, method, article, or apparatus that comprises a list of elements does not comprise only those elements but also others not expressly listed or inherent to such process, method, article, or apparatus. Without further limitation, an element defined by the statement "comprises a . . . " does not exclude the presence of another identical element in a process, method, article or apparatus that comprises the element.

The steps of a method or algorithm described in connection with the embodiments disclosed herein may be implemented directly in hardware, a software module executed by a processor, or a combination thereof. The software modules may be placed in random access memory (RAM), memory, read only memory (ROM), electrically programmable ROM, electrically erasable programmable ROM, registers, hard disks, removable disks, CD-ROM, or any other form of storage medium known in the art.

The above description is only preferred embodiments of the present invention and is not intended to limit the present invention in any way. Although the present invention has been disclosed as preferred embodiments, it is not intended to limit the present invention. Anyone skilled in the art can make many possible changes and modifications to the technical solution of the present invention or modify it into equivalent embodiments with equivalent changes by using the above disclosure and technical contents without departing from the scope of the technical solution of the present invention. Therefore, any simple modifications, equivalent changes and modifications made to the above embodiments according to the technical essence of the present invention without departing from the contents of the technical solution of the present invention are still within the scope of protection of the technical solution of the present invention.

What is claimed is:

1. A method for obtaining residual gravity anomaly, comprising:

obtaining a Bouguer gravity anomaly in a target region, wherein the Bouguer gravity anomaly comprises coordinates and field values of a plurality of sampling points in the target region;

determining a first pre-set range corresponding to each sampling point in the target region;

obtaining a first regional field value of each sampling point using a surface fitting method based on coordinates and field values of the sampling points within the first pre-set range corresponding to the each sampling point;

traversing the target region to obtain a first regional gravity anomaly of the target region according to the first regional field value of each sampling point in the target region; and obtaining a first residual gravity anomaly of the target region according to the Bouguer gravity anomaly and the first regional gravity anomaly, wherein said obtaining a first regional field value of each sampling point comprises:

performing surface fitting based on a coordinate and field value of a sampling point and coordinates and field values of k first reference sampling points around the sampling point in the first preset range corresponding thereto, to obtain a gravity anomaly surface of a first region corresponding to the sampling point, wherein k is a positive integer and the sampling point is a center point of the first preset range corresponding thereto; and substituting the coordinate of the sampling point into the gravity anomaly surface of the first region corresponding to the sampling point to obtain the first regional field value of the sampling point, wherein each of the k first reference sampling points is a sampling point with a distance of m units in the x-axis direction from the sampling point corresponding to the first pre-set range; and/or, each of the k first reference sampling points is a sampling point with a distance of m units in the y-axis direction from the sampling point corresponding to the first pre-set range, wherein, m=1, 2, K, i.

2. The method according to claim 1, further comprising:

determining a second pre-set range corresponding to each sampling point in the target region, wherein the first pre-set range and the second pre-set range corresponding to the same sampling point are different;

obtaining a second regional field values of each sampling point using a surface fitting method based on coordinates and a field value of the sampling points within the second pre-set range corresponding to the each sampling point;

traversing the target region to obtain a second regional gravity anomaly of the target region according to the second regional field value of each sampling point in the target region;

obtaining a second residual gravity anomaly of the target region according to the Bouguer gravity anomaly and the second regional gravity anomaly; and integrating the first residual gravity anomaly and the second residual gravity anomaly to obtain a third residual gravity anomaly of the target region.

3. The method according to claim 2, wherein the obtaining a second regional field value of each sampling point comprises:

performing surface fitting based on the coordinate and field value of the sampling point and coordinates and field values of k second reference sampling points around the sampling point in the second preset range corresponding thereto, to obtain a gravity anomaly surface of the second region corresponding to the sampling point, wherein k is a positive integer and the sampling point is a center point of the second pre-set range corresponding thereto; and substituting the coordinate of the sampling point into the gravity anomaly surface of the second region corresponding to the sampling point to obtain the second regional field value of the sampling point.

4. The method according to claim 3, wherein each of the k first reference sampling points is a sampling point with a distance of m units in the x-axis direction from the sampling point corresponding to the first preset range; and/or, each of the k first reference sampling points is a sampling point with a distance of m units in the y-axis direction from the sampling point corresponding to the first pre-set range; and each of the k second reference sampling points is a sampling point with a distance of n units in the x-axis direction from the sampling point corresponding to the second pre-set range; and/or, each of the k second reference sampling points is a sampling point with a distance of n units in the y-axis direction from the sampling point corresponding to the second pre-set range, wherein, m=1, 2, K, i; n=2m.

5. An apparatus for obtaining residual gravity anomaly, comprising a first acquisition processor module, a first determination processor module, a second acquisition processor module, a third acquisition processor module and a fourth acquisition processor module, wherein the first acquisition processor module is configured to acquire Bouguer gravity anomaly in a target region, wherein the Bouguer gravity anomaly comprises coordinates and field values of a plurality of sampling points in the target region;

the first determination processor module is configured to determine a first pre-set range corresponding to each sampling point in the target region;

the second acquisition processor module is configured to obtain a first regional field value of each sampling point by using a surface fitting method based on coordinates and field values of the sampling points within the first pre-set range corresponding to the each sampling point;

the third acquisition processor module is configured to traverse the target region to obtain a first regional gravity anomaly of the target region according to the first regional field value of each sampling point in the target region; and the fourth acquisition processor module is configured to obtain a first residual gravity anomaly of the target region according to the Bouguer gravity anomaly and the first regional gravity anomaly, wherein the second acquisition processor module is configured to perform surface fitting based on a coordinate and field value of a sampling point, and coordinates and field values of k first reference sampling points around the sampling point in the first preset range corresponding thereto, to obtain a gravity anomaly surface of a first region corresponding to the sampling point, wherein k is a positive integer and the sampling point is a center point of the first pre-set range corresponding thereto; and substitute the coordinate of the sampling point into the gravity anomaly surface of the first region corresponding to the sampling point to obtain the first regional field value of the sampling point, wherein each of the k first reference sampling points is a sampling point with a distance of m units in the x-axis direction from the sampling point corresponding to the first pre-set range; and/or, each of the k first reference sampling points is a sampling point with a distance of m units in the y-axis direction from the sampling point corresponding to the first pre-set range, wherein, m=1, 2, K, i.

6. The apparatus according to claim 5, further comprising a second determination processor module, a fifth acquisition processor module and a sixth acquisition processor module, wherein the second determination processor module is configured to determine a second pre-set range corresponding to each sampling point in the target region, wherein the first pre-set range and the second pre-set range corresponding to the same sampling point are different;

the fifth acquisition processor module is configured to obtain a second regional field value of each sampling point by using a surface fitting method based on coordinates and field values of the sampling points in the second pre-set range corresponding to the each sampling point;

the third acquisition processor module is further configured to traverse the target region to obtain a second regional gravity anomaly of the target region according to the second regional field value of each sampling point in the target region;

the fourth acquisition processor module is further configured to obtain a second residual gravity anomaly of the target region according to the Bouguer gravity anomaly and the second regional gravity anomaly; and the sixth acquisition processor module is configured to integrate the first residual gravity anomaly and the second residual gravity anomaly to obtain a third residual gravity anomaly of the target region.

7. The apparatus according to claim 6, wherein the fifth acquisition processor module is further configured to perform surface fitting based on the coordinate coordinates and field value of the sampling point and coordinates and field values of k second reference sampling points around the sampling point in the second preset range corresponding thereto, to obtain a gravity anomaly surface of a second region corresponding to the sampling point, wherein k is a positive integer and the sampling point is a center point of the second pre-set range corresponding thereto; and substitute the coordinate of the sampling point into the gravity anomaly surface of the second region corresponding to the sampling point to obtain the second regional field value of the sampling point.

8. The apparatus according to claim 7, wherein each of the k first reference sampling points is a sampling point with a distance of m units in the x-axis direction from the sampling point corresponding to the first preset range;

and/or, each of the k first reference sampling points is a sampling point with a distance of m units in the y-axis direction from the sampling point corresponding to the first pre-set range; and each of the k second reference sampling points is a sampling point with a distance of n units in the x-axis direction from the sampling point corresponding to the second pre-set range; and/or, each of the k second reference sampling points is a sampling point with a distance of n units in the y-axis direction from the sampling point corresponding to the second pre-set range, wherein, m=1, 2, K, i; n=2m.

* * * * *

UNITED STATES PATENT AND TRADEMARK OFFICE
CERTIFICATE OF CORRECTION

| | |
|---|---|
| PATENT NO. | : 11,409,020 B2 |
| APPLICATION NO. | : 16/764281 |
| DATED | : August 9, 2022 |
| INVENTOR(S) | : Zhenli Wang |

It is certified that error appears in the above-identified patent and that said Letters Patent is hereby corrected as shown below:

In the Claims

Claim 2, Column 19, Line 24 should read:
"field values of the sampling points"

Claim 3, Column 19, Line 45 should read:
"to obtain a gravity anomaly surface of a second region"

Signed and Sealed this
Twenty-ninth Day of November, 2022

Katherine Kelly Vidal
*Director of the United States Patent and Trademark Office*